US011520582B2

(12) United States Patent
Kravitz

(10) Patent No.: US 11,520,582 B2
(45) Date of Patent: Dec. 6, 2022

(54) CARRY CHAIN FOR SIMD OPERATIONS

(71) Applicant: Marvell Asia Pte, Ltd., Singapore (SG)

(72) Inventor: David Kravitz, Cambridge, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 23 days.

(21) Appl. No.: 17/069,721

(22) Filed: Oct. 13, 2020

(65) Prior Publication Data

US 2021/0026631 A1    Jan. 28, 2021

Related U.S. Application Data

(63) Continuation of application No. 14/940,538, filed on Nov. 13, 2015, now Pat. No. 10,838,719.

(60) Provisional application No. 62/079,762, filed on Nov. 14, 2014.

(51) Int. Cl.
*G06F 9/30* (2018.01)
(52) U.S. Cl.
CPC ...... *G06F 9/30036* (2013.01); *G06F 9/30014* (2013.01)
(58) Field of Classification Search
CPC .................................................. G06F 9/30036
See application file for complete search history.

(56) References Cited

U.S. PATENT DOCUMENTS

| 6,295,597 | B1 | 9/2001 | Resnick et al. | |
|---|---|---|---|---|
| 7,007,059 | B1 * | 2/2006 | Mohammed | G06F 7/506 708/233 |
| 8,090,755 | B1 * | 1/2012 | Old | G06F 1/022 708/271 |
| 10,838,719 | B2 | 11/2020 | Kravitz | |
| 2002/0035589 | A1 | 3/2002 | Saulsbury et al. | |
| 2003/0105617 | A1 * | 6/2003 | Cadambi | G06F 30/33 703/14 |
| 2010/0115232 | A1 | 5/2010 | Johnson et al. | |
| 2016/0011869 | A1 | 1/2016 | Jackson | |
| 2016/0126975 | A1 | 5/2016 | Lutz et al. | |

* cited by examiner

*Primary Examiner* — Jacob Petranek

(57) ABSTRACT

Examples of a carry chain for performing an operation on operands each including elements of a selectable size is provided. Advantageously, the carry chain adapts to elements of different sizes. The carry chain determines a mask based on a selected size of an element. The carry chain selects, based on the mask, whether to carry a partial result of an operation performed on corresponding first portions of a first operand and a second operand into a next operation. The next operation is performed on corresponding second portions of the first operand and the second operand, and, based on the selection, the partial result of the operation. The carry chain stores, in a memory, a result formed from outputs of the operation and the next operation.

20 Claims, 8 Drawing Sheets

CARRY CHAIN FOR SIMD OPERATIONS

RELATED APPLICATIONS

This application is a continuation of U.S. application Ser. No. 14/940,538 filed Nov. 13, 2015, now U.S. Pat. No. 10,838,719, which in turn claims the benefit of priority of U.S. Provisional Application No. 62/079,762 filed Nov. 14, 2014, the disclosures of both of which are incorporated herein by reference in their entirety.

BACKGROUND

The term single instruction, multiple data (SIMD) describes computers with multiple processing elements that perform the same operation on multiple data elements simultaneously. Most modern CPU designs, such as ARMv8, include SIMD instructions in order to improve the performance of multimedia use, like graphics or audio processing; SIMD instructions can also be used to accelerate digital signal processing in wireless communications systems and cryptographic applications. The data element width or size can vary, depending on the application; 8-bit, 16-bit, 32-bit, and 64-bit elements are commonly supported.

SUMMARY

In accordance with an example, a method for performing an operation on operands each including elements of a selectable size is provided, which adapts to elements of different sizes. The method includes determining a mask based on a selected size of an element. The method further includes selecting, at a multiplexer, based on the mask, whether to carry a partial result of an operation performed on corresponding first portions of a first operand and a second operand into a next operation. The next operation being performed on corresponding second portions of the first operand and the second operand, and, based on the selection, the partial result of the operation. The method further includes storing, in a memory, a result formed from outputs of the operation and the next operation.

In accordance with another example, a system for performing an operation on operands each including elements of a selectable size is provided, which adapts to elements of different sizes. The system includes a memory having computer executable instructions thereupon and an arithmetic logic unit (ALU) coupled to the memory. The computer executable instructions when executed by the ALU causes the ALU to determine a mask based on a selected size of an element. The ALU further caused to select, based on the mask, whether to carry a partial result of an operation performed on corresponding first portions of a first operand and a second operand into a next operation. The next operation being performed on corresponding second portions of the first operand and the second operand, and, based on the selection, the partial result of the operation. The ALU further caused to store, in the memory, a result formed from outputs of the operation and the next operation.

In accordance with yet another example, a tangible computer-readable storage medium having computer readable instructions stored therein for performing an operation on operands each including elements of a selectable size is provided, which adapts to elements of different sizes. The computer readable instructions when executed by an arithmetic logic unit (ALU), the ALU caused to determine a mask based on a selected size of an element. The ALU further caused to select, based on the mask, whether to carry a partial result of an operation performed on corresponding first portions of a first operand and a second operand into a next operation. The next operation being performed on corresponding second portions of the first operand and the second operand, and, based on the selection, the partial result of the operation. The ALU further caused to store, in memory, a result formed from outputs of the operation and the next operation.

In some examples, any of the aspects above can include one or more of the following features.

In other examples of the method, each element includes a least significant portion and the determining includes setting the mask indicating that an a priori carry-in is carried into the operation performed on corresponding least significant portions of the first operand and the second operand.

Some examples of the method further include setting the a priori carry-in to a value when the operation is any one of subtracting, inverting, and comparing.

Other examples of the method further include setting the a priori carry-in to a first value when the operation is an absolute value operation on positive-signed operands and setting the a priori carry-in to a second value when the operation is an absolute value operation on negative-signed operands.

In some examples of the method, each element includes a least significant portion and a next-least significant portion. The method further includes carrying an a priori carry-in into the operation performed on corresponding least significant portions of the first operand and the second operand, the output of the operation being a carry-out, and carrying the carry-out into the next operation performed on corresponding next-least significant portions of the first operand and the second operand.

In other examples of the method, a size of each of the first portion and the second portion is equal to the selected size of the element. The method further includes carrying a first a priori carry-in into an the operation performed on the corresponding first portions of the first operand and the second operand, and carrying a second a priori carry-in into the next operation performed on the corresponding second portions of the first operand and the second operand.

Some examples of the method further include calculating an intermediate partial result from the corresponding first portions of the first operand and the second operand and determining a carry-indicator for computing a carry-out of the operation. The carry-indicator is indicative of whether the carry-out is generated or a carry-in from a previous operation is propagated. The method further includes determining the carry-out based on the carry-indicator and the carry-in from the previous operation and determining the partial result of the operation from the intermediate partial result and the carry-in from the previous operation.

Other examples of the method include determining the partial result of the operation by computing the partial result from the intermediate partial result and the carry-in from the previous operation.

Some examples of the method include determining the partial result of the operation by selecting the partial result using the intermediate partial result and the carry-in from the previous operation.

Some examples of the method further include determining the selected size of the element based on an instruction stored in the memory. The instruction is a construct including the operation, first operand, and second operand.

Other examples of the method further include modifying the mask when the instruction is any one of lengthening, narrowing, and widening.

Some examples of the method include selecting a mask associated with a second element different than the element when the instruction is any one of lengthening, narrowing, and widening. The second element being next larger in size than the element.

In some examples of the method, the operation and the next operation each include a round constant. These examples further include selecting whether to carry into the next operation a first partial result and a second partial result of the operation performed on the round constant and the corresponding first portions of the first and second operands. The next operation being performed on the corresponding second portions of the first and the second operands, and, based on the selection, the first and second partial results. In these examples, carrying the second partial result represents carrying a two from the operation into the next operation.

In other examples of the system, given the element includes a least significant portion, the ALU is further caused to set the mask indicating that an a priori carry-in is carried into the operation performed on corresponding least significant portions of the first operand and the second operand.

In some examples of the system, given the element includes a least significant portion and a next-least significant portion, the ALU is further caused to carry an a priori carry-in into the operation performed on corresponding least significant portions of the first operand and the second operand, the output of the operation being a carry-out. The ALU is still further caused to carry the carry-out into the next operation performed on corresponding next-least significant portions of the first operand and the second operand.

In other examples of the system, the ALU is further caused to determine the selected size of the element from the computer executable instructions stored in the memory.

In some examples of the system, the ALU is further caused to perform the next operation on corresponding second portions of the first operand and the second operand, and, based on the selection, the partial result of the operation.

In other examples of the tangible non-transitory computer-readable storage medium, given the element includes a least significant portion, the ALU is further caused to set the mask indicating that an a priori carry-in is carried into the operation performed on corresponding least significant portions of the first operand and the second operand.

In some examples of the tangible non-transitory computer-readable storage medium, given the element includes a least significant portion and a next-least significant portion, the ALU is further caused to carry an a priori carry-in into the operation performed on corresponding least significant portions of the first operand and the second operand, the output of the operation being a carry-out. The ALU is still further caused to carry the carry-out into the next operation performed on corresponding next-least significant portions of the first operand and the second operand.

In other examples of the tangible non-transitory computer-readable storage medium, the ALU is further caused to determine the selected size of the element from the computer executable instructions stored in the memory.

In some examples of the tangible non-transitory computer-readable storage medium, the ALU is further caused to perform the next operation on corresponding second portions of the first operand and the second operand, and, based on the selection, the partial result of the operation.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION

Figure 1:
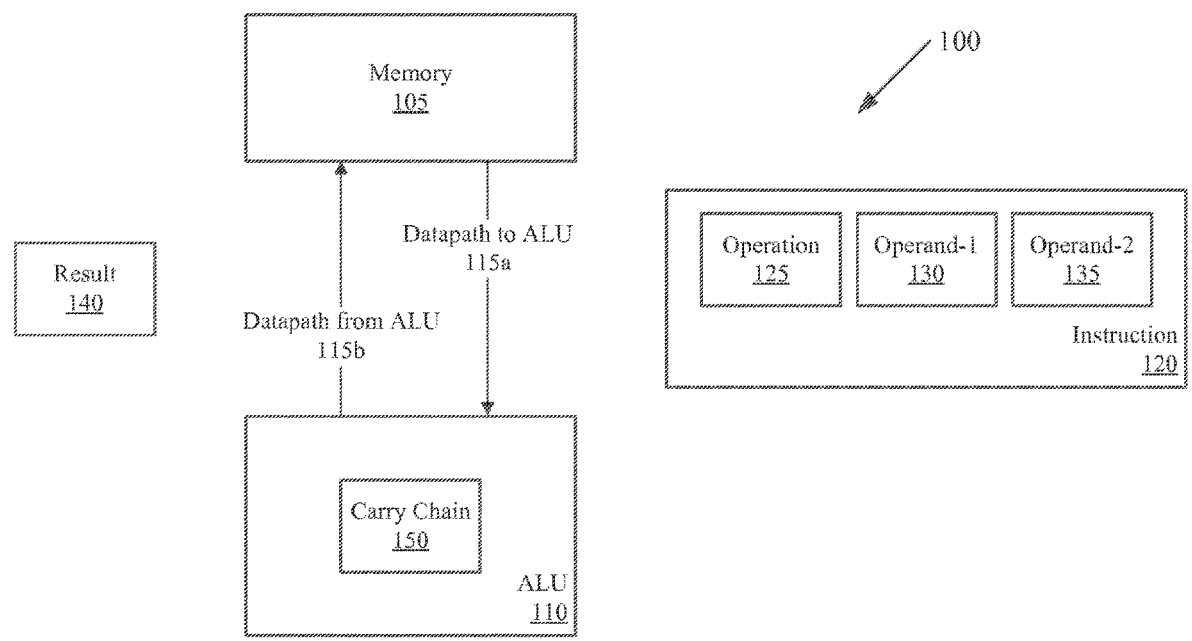
FIG. 1 is a block diagram of example system with memory and an arithmetic logical unit (ALU). The ALU includes a carry chain.

FIG. 1 shows an example system 100. The system 100 includes memory 105 and an arithmetic logic unit (ALU) 110. Datapaths 115a and 115b connect the memory 105 and the ALU 110 together. Other examples of the system 100 include other numbers of datapaths including one. Memory 105 stores instructions. An instruction 120 is a construct including, among other things, an operation 125, a first operand 130, and a second operand 135 each provided within a field of the instruction 120. Some instructions include fewer operands (e.g., one) or more operands (e.g., three).

The ALU 110 reads the instruction 120 from memory 105. The instruction 120 is provided to the ALU 110 over the datapath 115a. The ALU 110 performs the operation 125 on the first and second operands 130, 135, and outputs a result 140. The ALU writes the result 140 to memory 105 at a memory location specified in the instruction 120. The result 140 is provided from the ALU over the datapath 115b. Some examples of the system 100 include a memory for results separate from a memory for instruction.

Instructions for the ALU 110 can perform adds and subtracts, and related operations like compare, complement, absolute value, etc. For example, the ARM v8 SIMD instructions can perform adds and subtracts for four different element sizes—8-bit (also known as a byte), 16-bit (also known as a half-word), 32-bit (also known as a single word or word), and 64-bit (also known as a double word)—on two different datapath widths, 64-bit or 128-bit. The ALU 110 can see at one time, for example, an instruction that perform sixteen 8-bit additions, and at another time, four 32-bit additions.

To handle such a situation, one possible implementation of the ALU 110 involves building a different adder for each of the different element sizes, and then selecting among them the different adders to perform the operation. The drawback to this approach is that the area required on the ALU 110 to implement the solution increases with the number of different element sizes. Compared to processing a single element size, processing, for example, the four different element sizes of the ARM v8 SIMD instructions requires four times the area. Considering the trend toward smaller sized ALU's, using more processor area is undesirable. To address the foregoing shortcoming and other needs, ALU 110 includes a carry chain 150 that adapts to support different element sizes.

Figure 2:
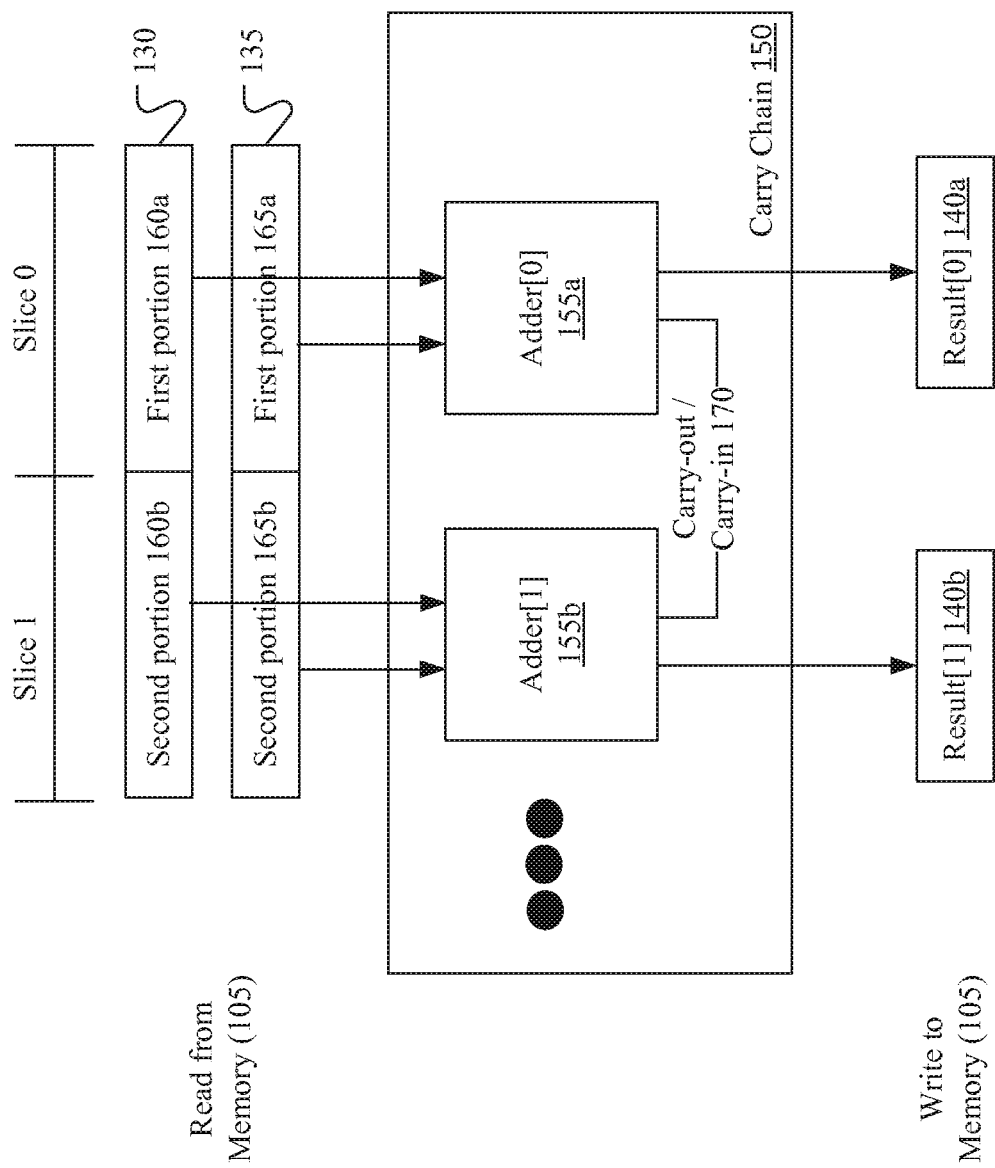
FIG. 2 is a block diagram of an example of the carry chain.

FIG. 2 shows an example of the carry chain 150. With reference to FIG. 1, the carry chain 150 performs the operation 125 on the first operand 130 and the second operand 135. The first and second operands 130,135 include a number of elements that are a selected size, e.g., 8, 16, 32 or 64-bits. The carry chain 150 includes a series of adders of which two are shown, adder[0] 155a and adder[1] 155b.

Each adder in the carry chain 150 works on part of the element called a "portion" and performs a "slice" of the operation. In FIG. 2, in slice[0], adder[0] 155a adds a first portion 160a of the first operand 130 and a first portion 165a of the second operand 135 together. The first portions 160a and 165a are "corresponding portions" of the first and second operands 130, 135. The carry chain 150 outputs a result[0] 140a. The carry chain 150 writes (stores) the output of each adder, of which result[0] 140a and result[1] 140b are shown, in memory 105. Collectively, the stored results represent the result 140 of the operation 130.

In slice[0], the carry chain 150 "carries" part of result[0] 140a, called a "carry-out" from slice[0] (a prior slice of the operation) into slice[1] (a next slice of the operation). The next adder in the carry chain 150, adder[1] 155b, performs the next slice of the operation. The adder[1] 155b adds together corresponding second portions 160b,165b of the first and second operands 130,135 and the carry-out from slice[0], referred to as a "carry-in." This is shown in the figure as carry-out/carry-in 170.

The carry chain 150 continues carrying the carry-out from one slice of the operation into the next and processing each portion of the element. When the carry chain reaches a first portion of a next element, the carry chain stops carrying the carry-out from the prior slice of the operation and the carry chain restarts (described later in greater detail).

The carry chain 150 is set to stop carrying after performing N slices of operations on N number of portions of an element. For example, the carry chain 150 can be set to stop carrying after performing one slice of the operation on one portion of the element; two slices of the operation on two portions of the element; four slices of the operation on four portions of the element; and eight slices of the operation on eight portions of the element. Setting where in a carry chain to stop carrying a carry-out into a next operation and insert a carry-in is beneficial because it enables examples of the carry chain 150 to adapt to elements of different sizes.

Figure 3:
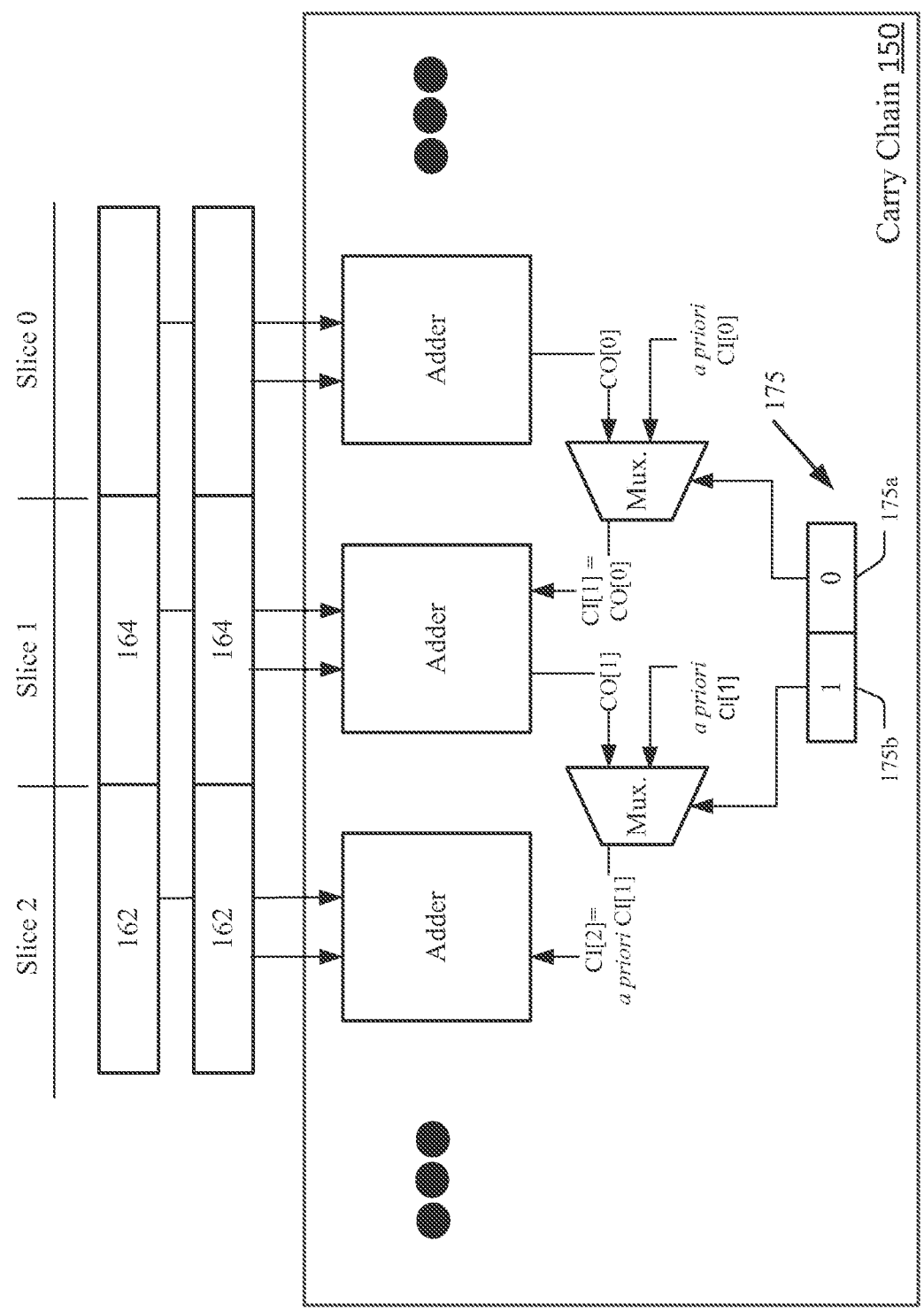
FIG. 3 is a block diagram of an example of the carry chain including adders and multiplexers.

FIG. 3 shows a convenient example of the carry chain. The carry chain includes adders and multiplexers of which three adders and two multiplexers are shown. The adders and multiplexers are arranged with one multiplexer between two adders. Inputs to a multiplexer include a carry-out, an a priori carry-in, and a selector. As discussed above, the carry-out is part of a result computed in a previous slice of the operation. The value of the a priori carry-in provided to the carry chain can be computed in accordance with any number of well-known techniques. In a convenient example of the carry chain, in general, the value of the a priori carry-in is one for subtracting, comparing, and inverting operations; one or zero for absolute value operations depending on the sign of the operands; and zero for other operations, such as adding (described below in greater detail below). The foregoing is only an example set of operations to which examples of the carry chain can be applied. The principles of the carry chain described in this disclosure can be applied to other operations, such as complementing and negating, and instructions that return the sum of two input operands, divided-by-2, with rounding.

The multiplexer selects whether the carry chain carries the carry-out or the a priori carry-in into a next slice of the operation based on the selector. In a convenient example, the selectors for the multiplexers form a bit mask 175. Each bit in the mask 175 corresponds to the carry chain 150 performing a slice of the operation on a portion of the element. It should be readily apparent to those skilled in the art that a different number of bits (e.g., two or three) can be used to index or reference the slice of the operation performed by the carry chain 150.

An element includes a least significant portion and, depending on the size of the element, one or more next-least significant portions. For example, given an 8-bit portion, a 32-bit element includes one least significant portion and three next-least significant portions. In the example shown, corresponding least significant portions of the operands are referenced, collectively, as 162 and corresponding next-least significant portions of the operands are referenced, collectively, as 164.

The mask 175 includes mask bit 175a corresponding to a slice of the operation performed on the corresponding next-least significant portions 164. The mask bit 175a is set to 0 and the multiplexer selects a carry-out CO[0] from a previous slice of the operation, slice[0]. This causes the carry chain 150 to carry CO[0] into a next slice of the operation slice[1], which is shown in the figure as "CI[1]=CO[0]." The adder adds together CI[1] and the corresponding next-least significant portions 164.

Continuing with the example shown in FIG. 3, mask bit 175b corresponds to a slice of the operation performed on the corresponding least significant portion 162. The mask bit 175b is set to 1 and the multiplexer selects a priori carry-in[1]. This causes the carry chain to stop carrying a carry-out and insert an a priori carry-in instead, shown in the figure as "CI[2]=a priori carry-in[1]." The adder adds together a priori carry-in[1] and the corresponding least significant portions 162.

Figure 4:
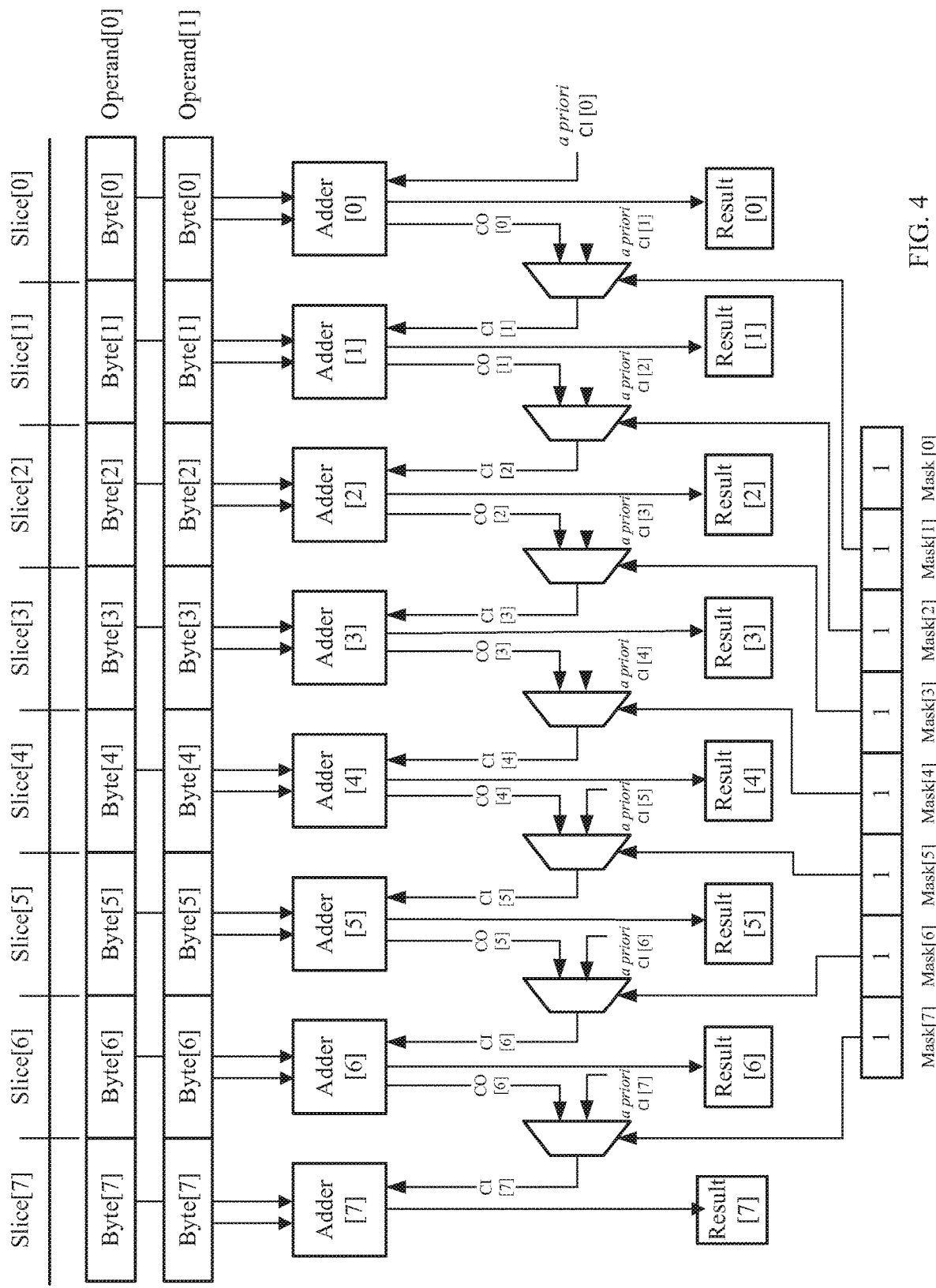
FIG. 4 is a block diagram of an example of the carry chain adding two 64-bit operands each including eight bytes.

FIG. 4 shows an example of the carry chain performing an operation adding two 64-bit operands, referred to in the figure as operand[0] and operand[1]. Each operand includes eight elements that are each eight bits in size. Each element includes one 8-bit portion, referred to in the figure as byte[0] through byte[7]. The size of the element and size of the portion are the same. Each element includes a least significant portion and no next-least significant portion. The carry chain completes the adding operation in eight slices, referred to in the figure as slice[0] through slice[7].

In this example, a mask includes eight bits, referred to in the figure as mask[0] through mask[7]. Mask[0] through mask[7] correspond to the eight slices of the operation. Each bit in the mask is set to 1 indicating that the carry chain carries an a priori carry-in into a slice of the operation. Each a priori carry-in, referred to in the figure as, a priori CI[0] through a priori CI[7], has a value of one.

In slice[0], adder[0] adds together a priori CI[0], byte[0] of operand[0], and byte[0] of operand[1]. The carry chain stores the output, referenced in the figure as result[0], in memory (e.g., memory 105 of FIG. 1). Part of result[0] is carry-out CO[0]. In slice[1], mask[1] is set to 1 and multiplexer selects a priori CI[1] over CO[0] as carry-in CI[1]. Adder[1] adds CI[1], byte[1] of operand[1], and byte[1] of operand[2] together. The carry chain stores the output, result[1], in memory.

The adding operation continues with the carry chain, based on the mask, carrying an a priori carry-in into a next slice of the operation instead of a carry-out from a previous slice of the operation; adding the a priori carry-in to corresponding next bytes of operand[0] and operand[2] together; and storing the results in memory. Collectively, result[0] through result[7] form the result of the adding operation.

Figure 5:
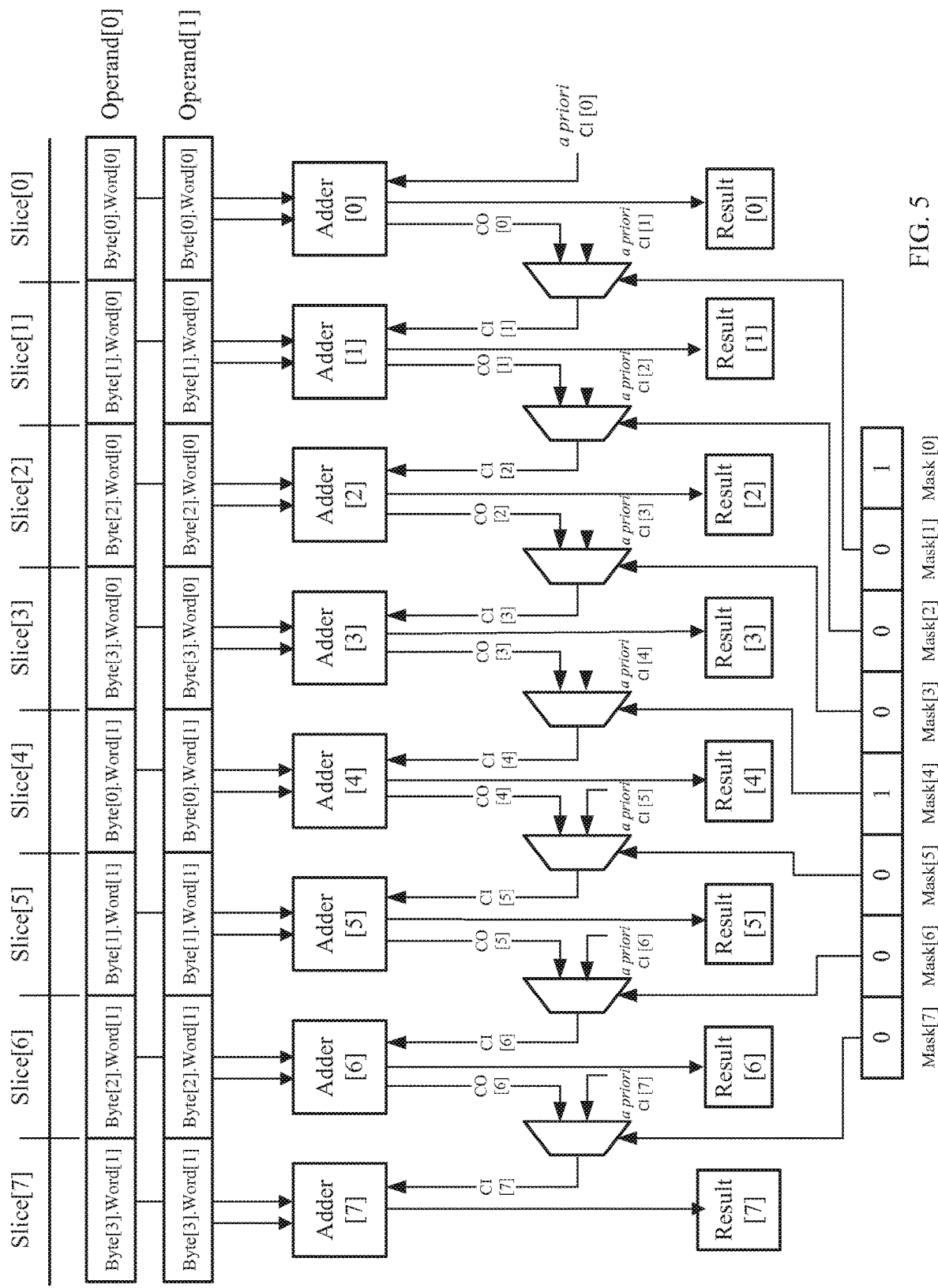
FIG. 5 is a block diagram of an example of the carry chain adding two 64-bit operands each including two 32-words. Each word includes four bytes.

FIG. 5 shows an example of the carry chain performing an operation adding two 64-bit operands, referred to in the figure as operand[0] and operand[1]. Each operand includes two elements, referred to in the figure as (single) word[0] and (single) word[1] that are each thirty-two bits in size. Each word includes four 8-bit portions, referred to in the figure as byte[0].word[0] through byte[3].word[0] and byte[0].word[1] through byte[3].word[1]. Byte[0] is the least significant byte of the word. Byte[1], byte[2], and byte[3] are next-least significant bytes. The carry chain completes the adding operation in eight slices, referred to in the figure as slice[0] through slice[7].

In this example, a mask includes eight bits, referred to in the figure as mask[0] through mask[7], corresponding to the eight slices of the operation. Mask[0] corresponds with the carry chain performing slice[0] of the operation on byte[0], which is the least significant portion of word[0]. Mask[4] corresponds with the carry chain performing slice[4] of the operation on byte[4], which is the least significant portion of word[1]. Mask[0] and mask[4] are set to 1 to indicate that the carry chain carries a priori carry-in CI[0] into slice[0] and a priori carry-in CI[0] into slice[4]. Mask[1], mask[2], mask[3], mask[5], mask[6], and mask[7] are each set to 0. This indicates that the carry chain carries a carry-out into slice[1], slice[2], slice[3], slice[5], slice[6], and slice[7].

In slice[0], the carry chain adds together a priori CI[0] and corresponding byte[0].word[0] of operand[0] and operand[1]. The carry chain stores the output, referenced in the figure as result[0], in memory (e.g., memory 105 of FIG. 1). Part of result[0] is carry-out CO[0].

In slice[1], mask[1] is set to 0 and the multiplexer selects CO[0] from slice[0] over a priori CI[1] as carry-in CI[1]. The adder adds together CI[1] and corresponding byte[1].word[0] of operand[0] and operand[1]. The carry chain stores the output, result[1], in memory. Part of result[1] is carry-out CO[1].

In slice[2], mask[2] is set to 0 and the multiplexer selects CO[1] from slice[1] over a priori CI[2] as carry-in CI[2]. The adder adds together CI[2] and corresponding byte[2].word[0] of operand[0] and operand[1]. The carry chain stores the output, result[2], in memory. Part of result[2] is carry-out CO[2].

In slice[3], mask[3] is set to 0 and multiplexer selects CO[2] from slice[2] over a priori CI[3] as carry-in CI[3]. The adder adds together CI[3] and corresponding byte[2].word[0] of operand[0] and operand[1]. The carry chain stores the output, result[3], in memory. Part of result[3] is carry-out CO[3].

In slice[4], mask[4] is set to 1 and multiplexer selects a priori CI[4] over CO[3] as carry-in CI[4]. The adder adds together CI[4] and corresponding byte[1].word[1] of operand[0] and operand[1]. The carry chain stores the output, result[4], in the memory. Part of result[4] is carry-out[4].

With mask[5], mask[6], and mask[7] set to 0, the carry chain continues and carries carry-out CO[4] into slice[5], carries carry-out CO[5] into slice[6], and carries carry-out CO[6] into slice[7]. The carry chain stores the outputs, result[5], result[6], and result[7], in memory. Collectively, result[0] through result[7] form the result of the adding operation.

Some examples of the carry chain determine the selected size of the element from an instruction stored in memory. The carry chain reads the element size from the instruction (size field) and sets the mask. For example, given an element size of eight bits (byte) the carry chain sets the mask to 11111111; given an element size of 16 bits (half-word) the carry chain sets the mask to 01010101; and given an element size of 32 bits (single word) the carry chain sets the mask to 00010001.

Other examples of the carry chain modify the mask based on an instruction. In a convenient sample, when the carry chain processes a lengthening, widening or narrowing instruction, the carry chain sees the element size as one size larger than the element size described in the size field of the instruction. For example, the carry chain receives a lengthening instruction with an operation to add two operands each having eight bytes. The carry chain sets the mask to 01010101, the mask for a half-word, which is the next larger element than a byte. Advantageously, this approach enables the carry chain to adapt to a variety of different types of instructions.

Some instructions cause a "carry-the-2" scenario. These instructions perform an add (or subtract), round out of the lower half of each result, and return only the upper half of each result. The output element size is one-half the input element size. For these instructions, there may already be a carry-out (first partial result) of the lower half of the result and rounding can create another carry-out (second partial result). This has the effect of carrying a '2' out of the lower half-element and into the upper half-element. The fact that a '2' has been carried into an element means that a '2' can be carried out of any portion (e.g., byte) within the element, even though rounding is not active for those portions.

Figure 6:
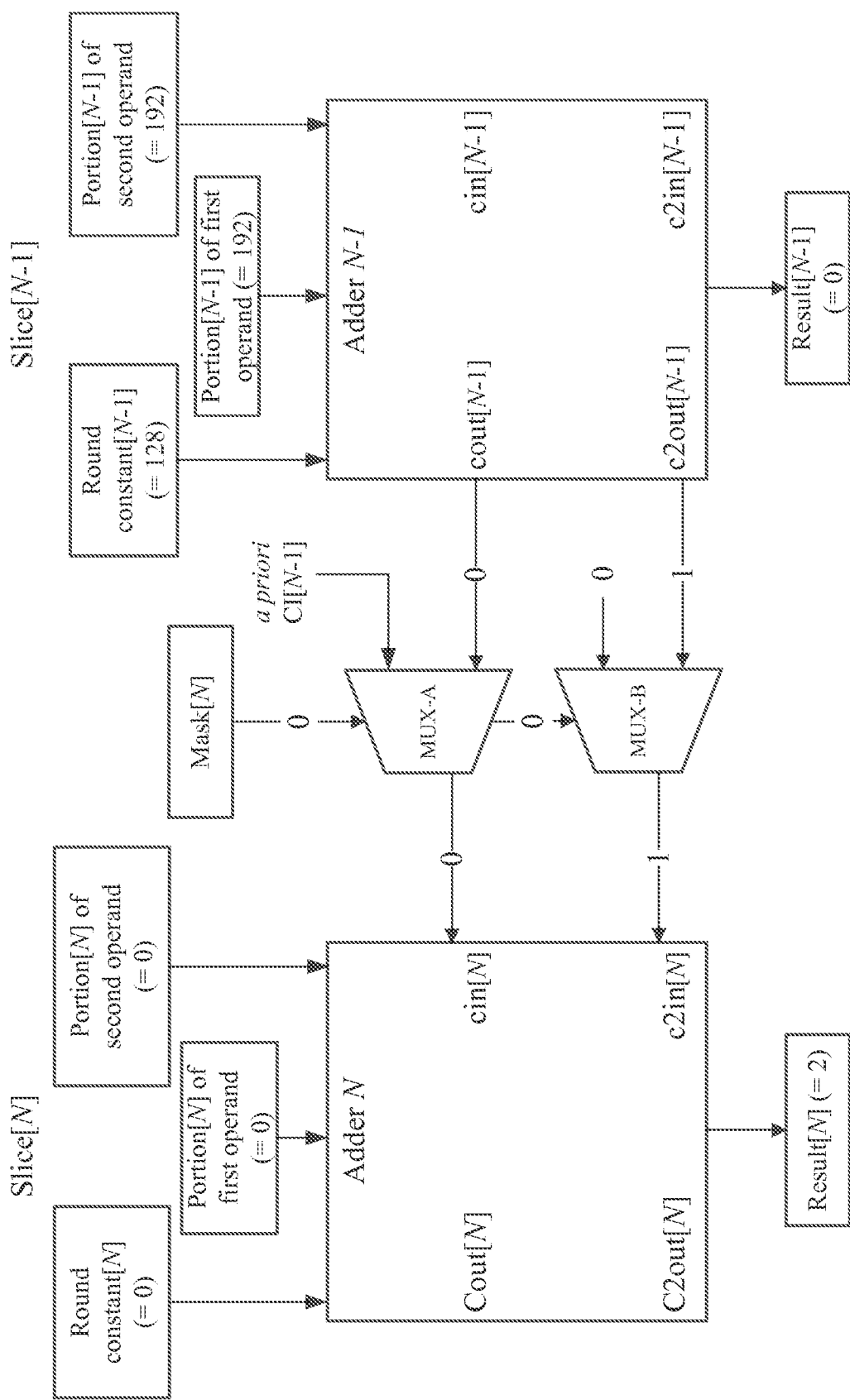
FIG. 6 is a block diagram of an example of a carry chain for handling a "carry-the-2" scenario.

FIG. 6 shows an example carry chain 200 for handling an operation involving "carry-the-2." The carry chain 200 includes adders and multiplexers of which adders, adder[N−1] and adder[N], and multiplexers, MUX-A and MUX-B, are shown. The adders and multiplexers are arranged with two multiplexers between every two adders. Describing adder[N] in greater detail (recognizing that the following description applies to adder[N−1] and the other adders in the carry chain 200) inputs to adder[N] include portion[N] of a first operand, portion[N] of a second operand, and round constant[N]. Adder[N] also receives carry-in signals cin[N] and c2in[N]. The c2in signal represents carrying a two from adder[N−1] to adder[N], which is described below in greater detail.

Adder[N] performs a slice of the operation on corresponding portions[N] of the first and second operands, round constant[N], and the signals cin[N] and c2in[N]. Adder[N] outputs the result of the operation as result[N]. Adder[N] sends carry-out signals, cout[N] and c2out[N]. The signals cout[N] and c2out[N] represent, respectively, first and second parts of result[N], i.e., first partial result and second partial result.

The inputs to MUX-A include an a priori carry-in (a priori CI[N]), cout[N] signal, and a selector (mask[N]). The inputs to MUX-B include zero, c2out[N] signal, and the selector (mask[N]). The output of MUX-A is the cin[N] signal and the output of MUX-B is the c2in[N] signal. The values of cin[N] and c2in[N] depend on the value of mask[N]. For example, when mask[N] is set to zero, the multiplexer sets (selects) the values of cin[N] and c2in[N] to the values of cout[N−1] and c2out[N−1], respectively. In this example, a selector value of zero indicates that the carry chain carries cout[N−1] and c2out[N−1] from adder[N−1] to adder[N]. It should be readily apparent to those skilled in the art that such a carry-out indication can be associated with a selector having a different value, such as one.

With continued reference to FIG. 6, consider the following example, which for ease of discussion is described using decimal math. Adder[N−1] and adder[N] are each 8-bit adders. The carry chain 200 completes the operation in N slices, of which slice[N−1] and slice[N] are shown. In slice[N−1], the corresponding[N−1] portions of the first and second operands both have a value of 192. Round constant [N−1] has a value of 128. The round constant value depends on the size of an element and on the slice of the operation being performed. In some instances, the value of a round constant is zero. The round constant value per given slice can be determined using any number of well-known techniques.

Adder[N−1] performs slice[N−1] of the operation. The basic sum of the corresponding portions[N] is 384, which can be written in shorthand notation as 1*256+128. Because adder[N−1] outputs an 8-bit number, in a different example, the carry chain 200 carries a "1" out of adder[N−1] and into adder[N]. This is represented as 1*256 in the notation above. In the present example, however, adder[N−1] still needs to add round constant[N−1], so the carry chain 200 does not carry the 1, which is shown in the figure as cout[N−1]=0.

Adder[N−1] adds round constant[N−1] (128) to the sum of the corresponding [N−1] portions (384). The basic sum of adding 128 and 384 is 512, which can be written in shorthand notation as 2*256. Because adder[N−1] outputs an 8-bit number, the carry chain 200 carries a "2" out of adder[N−1] and into adder[N]. This is represented as 2*256 in the notation above. The outputs of adder[N−1] include result[N−1]=0, cout[N−1]=0, and c2out[N−1]=1. In this example, c2out[N−1]=1 represents carrying out a two.

Mask[N] is set to zero indicating that the carry chain 200 carries cout[N−1] and c2out[N−1] out from adder[N−1] and into adder[N]. Mask[N] with a value of zero 0 selects cout[N−1] and c2out[N−1]. In turn, MUX-A passes cin[N]=0 and MUX-B passes c2in[N]=1 to adder[N]. In this example, c2in[N]=1 represents carrying in the two.

In slice[N], the corresponding [N] portions of the first and second operands, and round constant [N] have a value of 0. Adder[N] receives cin[N]=0 and cin[N]=1. Adder[N] performs slice[N] of the operation on these inputs and outputs result[N]=2. The foregoing demonstrates a feature of the carry chain 200. Suppose the initial size of an element is sixteen bits and an operation returns an 8-bit result (e.g., as in a narrowing instruction). There are no bits set in the upper eight bits of the 16-bit element. The carry chain 200 effectively carries a 2 out of the lower eight bits into the upper eight bits.

In the example described above, the carry chain 200 carries the 2 where the round constant is applied. Other examples of the carry chain 200 carry a 2 where the round constant is not applied. In these examples, because the carry chain 200 can carry a 2 out of any one of a number of operation slices, the carry chain 200 is advantageously configured to carry the 2 into any of the operation slices.

Figure 7:
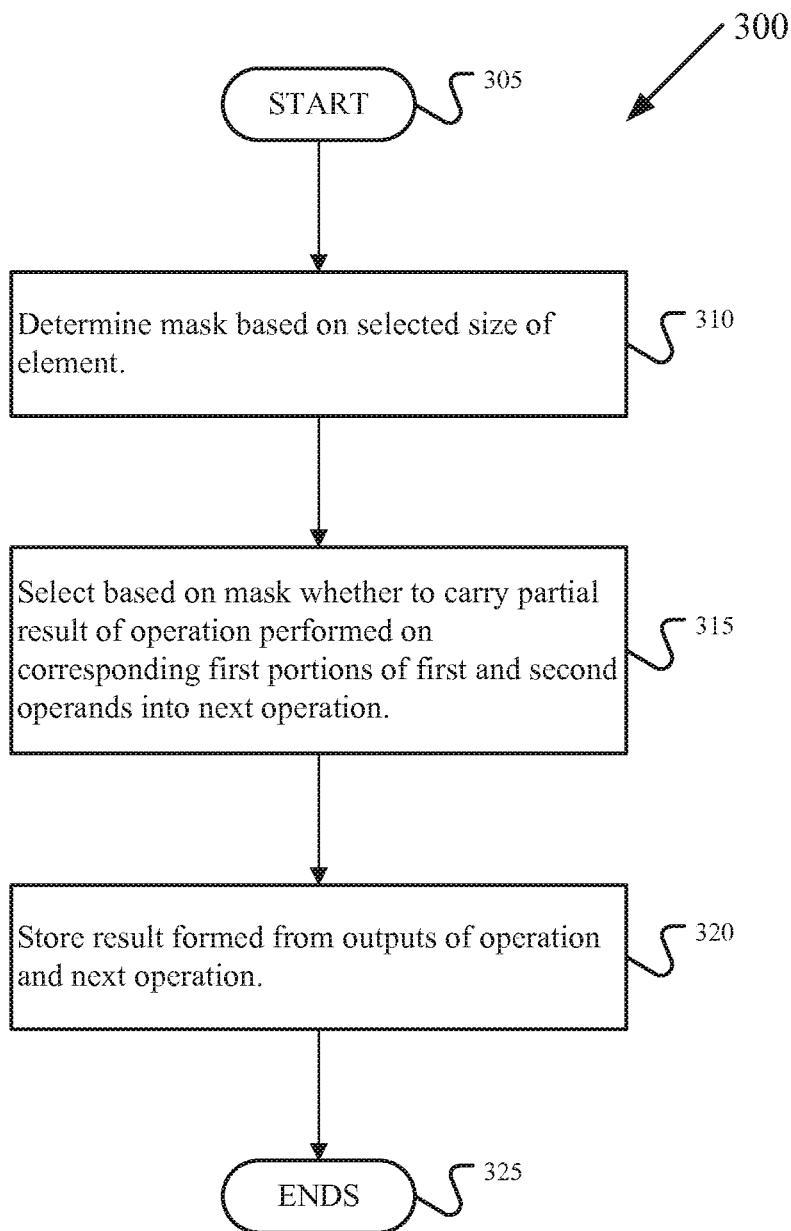
FIG. 7 is a flow chart of an example process carried out by an example of the carry chain.

FIG. 7 shows an example process 300 performed by an example of the carry chain 150. The process 300 starts 305. The process 300 determines (310) a mask based on a selected size of an element. The process 300 selects (315), based on the mask, whether to carry a partial result of an operation performed on corresponding first portions of a first operand and a second operand into a next operation. The next operation is performed on corresponding second portions of the first operand and the second operand, and, based on the selection, the partial result of the operation. The process 300 stores (320), in a memory (e.g., memory 105 for FIG. 1), a result formed from outputs of the operation and the next operation. The process 300 ends (325).

Figure 8:
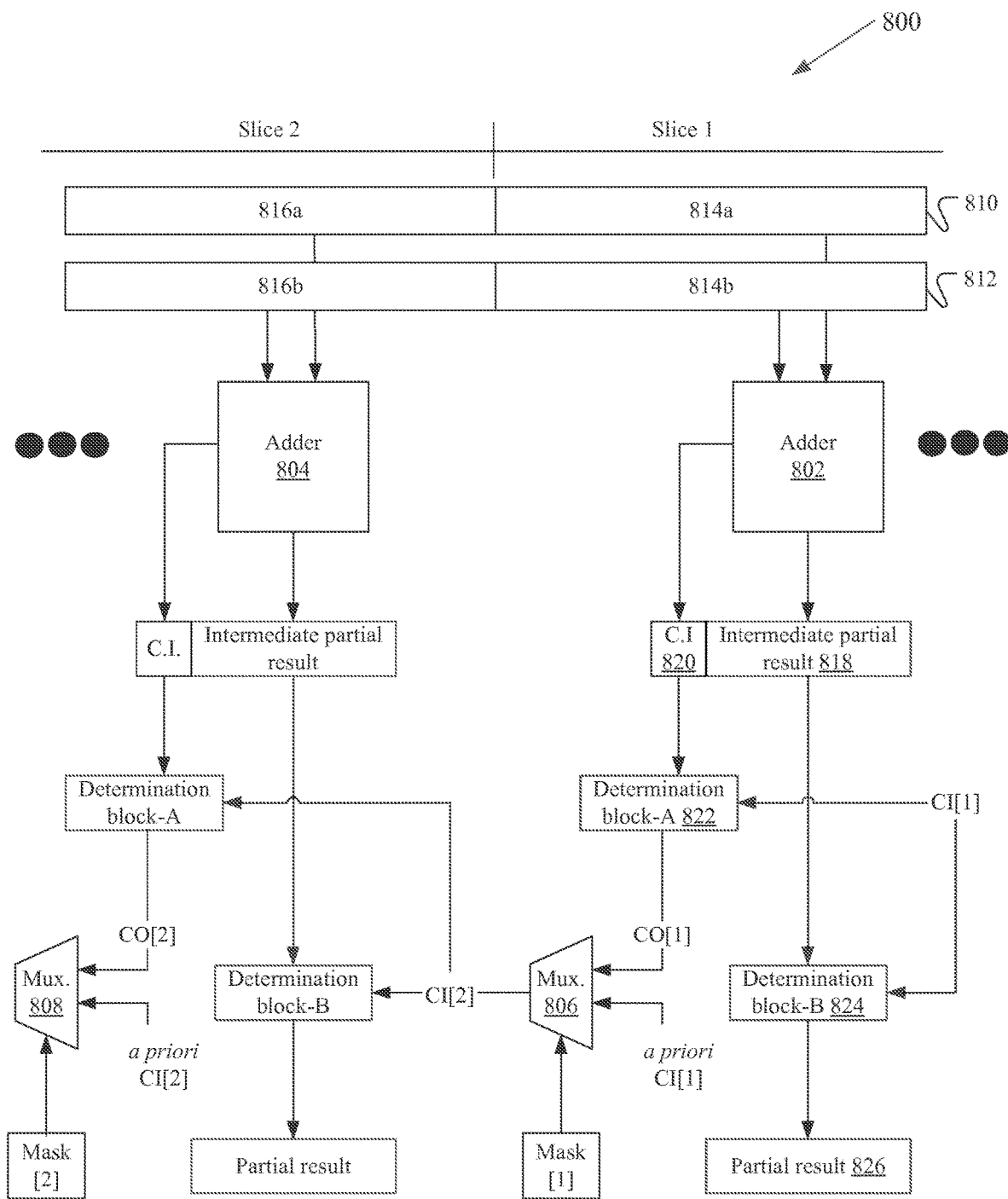
FIG. 8 is a block diagram of an example of a pipelined carry chain.

FIG. 8 shows an example of a pipelined carry chain 800. The pipelined carry chain 800 includes adders and multiplexers of which two adders 802, 804 and two multiplexers 806, 808 are shown. The adders and multiplexers are arranged with one multiplexer between two adders. The pipelined carry chain 800 further includes logic for pipelining, which makes the pipelined carry chain 800 faster than other implementations of a carry chain, such as the carry chain 150 described above with reference to FIG. 3.

An operation is performed on operand-1 810 and operand-2 812, of which slice 1 and slice 2 of the operation are shown. In the example shown, each operand is divided into a first portion and a second portion, which, as described above, can correspond with least and next least significant portions of an operand. In slice 1 of the operation, the adder 802 calculates an intermediate partial result 818 based on corresponding first portions of operand-1 and operand-2, labeled 814a and 814b, respectively. The result is considered an intermediate result because at this point the pipelined carry chain 800, a carry-in from a previous slice of the operation is not considered.

The adder 802 also determines a carry-indicator 820 based on the corresponding first portions of operand-1 and operand-2 814a, 814b. The carry-indicator 820 is used to calculate a carry-out of slice 1 of the operation, labeled in the FIG. 8 as CO[1]. The carry-indicator 820 is indicative of whether the carry-out CO[1] will be generated in slice 1 of the operation or will be propagated from a carry-in from a previous slice of the operation, labeled in the FIG. 8 as CI[1]. Any one of a number of well-known techniques can be used to determine carry-indicator 820. In a convenient example, the intermediate partial result 818 and the carry-indicator 820 are stored in a pipeline register or other temporary memory.

The logic implemented by pipelined carry chain 800 includes, for each slice of the operation, logic for determining a carry-out and a partial result of the slice of the operation. For ease of reference and for purposes of explaining examples of the pipelined carry chain 800, the logic is shown in the example of FIG. 8 as determination block-A and determination block-B. In slice 1 of the operation, a determination block-A 822 determines the carry-out CO[1] based on the carry-indicator 820 and the carry-in CI[1] from the previous operation.

A determination block-B 824 determines a partial result 826 of slice 1 of the operation from the intermediate partial result 818 and the carry-in CI[1] from the previous operation. In one example, the pipelined carry chain 800 computes the partial result 826 from the intermediate partial result 818 and the carry-in CI[1] 820. For ease of discussion, this approach is called the "simple-adder" approach. In another example, the pipelined carry chain 800 selects one of several possible partial results as the partial result 826 using the carry-in CI[1]. For ease of discussion, this approach is called the "carry-select" approach.

The choice of a particular approach may be dictated by the area on a chip needed to implement the approach, the power used in carrying out the approach, the time needed to perform the approach, and other constraints. For example, the "simple-adder" approach calculates (and in some examples, stores in a pipelined carry chain) one intermediate partial result. As such, the simple-adder approach can require less area and consume less power than other approaches, such as the "carry-select" approach. The simple-adder approach can incur, for example, a delay of an "8-bit ripple" and, as such, can be slower than other approaches, such as the "carry-select" approach.

One example of the "carry-select" approach requires a mux using carry-in information as a select and, as such, can be faster than other approaches, such as the "simple-adder" approach. The "carry-select" approach calculates (and in some examples, stores in a pipelined carry chain) multiple potential (possible) intermediate partial results and, as such, can require more area and can consume more power than other approaches, such as the "simple-adder" approach.

The several possible partial results can be readily computed from the intermediate partial result 818 according to any one of number of well-known techniques. These results are consider possible results because they are not determined using the carry-in CI[1].

The carry-out CO[1] from slice 1 of an operation, as determined, by the foregoing logic is then provided to the multiplexer 806 as an input. Other inputs to the multiplexer 806 include an a priori carry-in CI[1], and a selector mask[1]. The multiplexer 806 selects whether the pipelined carry chain 800 carries the carry-out CO[1] or the a priori carry-in CI[1] into slice 2 of the operation (labeled in the FIG. 3 as CI[2]) based on the selector mask[1]. In a convenient example, the selectors for the multiplexers form a bit mask (similar to the mask 175 described above with reference FIG. 3). The pipelined carry chain 800 proceeds to the next slice of the operation, slice 2, and the foregoing process repeats with corresponding second portions of the operand 1 and operand 2, labeled 816a and 816b in FIG. 8, respectively.

The foregoing examples of a pipelined approach allow a carry-in to a next slice of an operation to be calculated in what is essentially one level of logic instead of having to "ripple" across 8-bits of an adder, as is case with the carry chain 150 described above with reference to FIG. 3. Advantageously, the pipelined carry chain 800 is faster than other implementations of a carry chain, such as the carry chain 150 described above with reference to FIG. 3. Those skilled in the art will readily recognize that the described pipelining technique can also be applied to an operation involving "carry-the-2," which was discussed above with reference to FIG. 6.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method, comprising:
    calculating a first partial result based on a first portion of a first operand of an instruction and a first portion of a second operand of the instruction;
    determining a carry-out from a first slice of an operation of the instruction, wherein the first slice is performed using a first adder of a pipelined carry chain;
    accessing inputs comprising an a priori carry-in and a selector mask, wherein the selector mask is determined by setting a sequence of a plurality of bits of the selector mask based on a size of an element of the first operand and an element of the second operand; and
    selecting, based on the selector mask, one of the carry-out and the a priori carry-in as an input for performing a second slice of the operation, wherein the second slice is performed using a second adder of the pipelined carry chain.

2. The method of claim 1, further comprising determining a carry-indicator based on the first portion of the first operand and the first portion of the second operand, wherein the carry-indicator indicates one of: i) the carry-out is generated in the first slice, and ii) the carry-out is propagated to the first slice as a carry-in from a slice that precedes the first slice.

3. The method of claim 2, further comprising storing the first partial result and the carry-indicator in a register of the pipelined carry chain.

4. The method of claim 1, further comprising determining a second partial result based on the first partial result and a carry-in from a slice that precedes the first slice.

5. The method of claim 1, further comprising selecting a second partial result from a plurality of partial results using a carry-in from a slice that precedes the first slice.

6. The method of claim 5, further comprising:
    determining the plurality of partial results using the first partial result and without using the carry-in; and
    storing the plurality of partial results in memory coupled to the pipelined carry chain.

7. The method of claim 1, wherein the first portion of the first operand comprises bits comprising the least significant bit of the first operand, and wherein the first portion of the second operand comprises bits comprising the least significant bit of the second operand.

8. The method of claim 1, wherein the selector mask comprises: a first bit value corresponding to the first slice, and a second bit value corresponding to the second slice.

9. The method of claim 1, further comprising:
    setting the a priori carry-in to a first value when the operation is an absolute value operation on positive-signed operands; and
    setting the a priori carry-in to a second value different from the first value when the operation is an absolute value operation on negative-signed operands.

10. The method of claim 1, wherein said selecting is performed by a multiplexer of the pipelined carry chain, and wherein the multiplexer is coupled between the first adder and the second adder.

11. A system comprising a pipelined carry chain, the pipelined carry chain comprising:
    a first adder and a second adder, wherein a first slice of an operation of an instruction is performed using the first adder, and wherein a second slice of the operation is performed using the second adder;
    a multiplexer coupled to and between the first adder and the second adder; and
    determination logic coupled to the first adder and the multiplexer;
    wherein the first adder calculates a first partial result based on a first portion of a first operand of the instruction and a first portion of a second operand of the instruction,
    wherein the determination logic determines a carry-out from the first slice;
    wherein the carry-out from the first slice is input to the multiplexer, wherein the multiplexer also accesses inputs comprising an a priori carry-in and a selector mask, wherein the selector mask is determined by setting a sequence of a plurality of bits of the selector mask based on a size of an element of the first operand and an element of the second operand, and wherein the multiplexer selects, based on the selector mask, one of the carry-out and the a priori carry-in as an input for performing the second slice.

12. The system of claim 11, wherein the first adder also determines a carry-indicator based on the first portion of the first operand and the first portion of the second operand, wherein the carry-indicator indicates one of: i) the carry-out is generated in the first slice, and ii) the carry-out is propagated to the first slice as a carry-in from a slice that precedes the first slice.

13. The system of claim 12, wherein the first partial result and the carry-indicator are stored in a register of the pipelined carry chain.

14. The system of claim 12, wherein the determination logic also determines a second partial result based on the first partial result and a carry-in from the slice that precedes the first slice.

15. The system of claim 12, wherein the determination logic also selects a second partial result from a plurality of predetermined partial results using a carry-in from the slice that precedes the first slice.

16. The system of claim 15, wherein the determination logic comprises a multiplexer that uses the carry-in from the slice that precedes the first slice to select the second partial result from the plurality of partial results.

17. The system of claim 15, wherein the plurality of partial results is determined using the first partial result without using the carry-in and is stored in memory coupled to the pipelined carry chain.

18. The system of claim 11, wherein the first portion of the first operand comprises bits comprising the least significant bit of the first operand, and wherein the first portion of the second operand comprises bits comprising the least significant bit of the second operand.

19. The system of claim 11, wherein the selector mask comprises: a first bit value corresponding to the first slice, and a second bit value corresponding to the second slice.

20. The system of claim 11, wherein the a priori carry-in is set to a first value when the operation is an absolute value operation on positive-signed operands, and wherein the a priori carry-in is set to a second value different from the first value when the operation is an absolute value operation on negative-signed operands.

* * * * *